United States Patent [19]

Barth et al.

[11] Patent Number: 4,478,686
[45] Date of Patent: Oct. 23, 1984

[54] PROCESS AND APPARATUS FOR RECOVERY OF SOLVENTS

[75] Inventors: Peter Barth, Neuwied; Bernd Blaudszun, Steinkirchen, both of Fed. Rep. of Germany

[73] Assignee: Lohmann GmbH & Co. KG, Neuwied, Fed. Rep. of Germany

[21] Appl. No.: 311,340

[22] Filed: Oct. 14, 1981

[30] Foreign Application Priority Data

Oct. 14, 1980 [DE] Fed. Rep. of Germany ....... 3038790

[51] Int. Cl.$^3$ ............................................. B01D 3/34
[52] U.S. Cl. ....................................... 203/49; 202/134
[58] Field of Search ................... 203/49; 208/356, 362; 202/134; 55/52, 53; 23/307

[56] References Cited

U.S. PATENT DOCUMENTS 4,375,387 3/1983 de Filippi et al. ..................... 203/49

FOREIGN PATENT DOCUMENTS 2725252 3/1977 Fed. Rep. of Germany .

OTHER PUBLICATIONS

Ullmann's Encyclopedia of Technical Chemistry, vol. 1, (1951), p. 338.

Primary Examiner—Frank Sever
Attorney, Agent, or Firm—Webb, Burden, Robinson & Webb

[57] ABSTRACT

A process for the recovery of solvents is disclosed. A hot carrier gas stream laden with solvent vapors from an evaporation space is compressed, cooled, and expanded with production of work for condensing and separating the solvent. The carrier gas stream lean in solvent vapors is conducted back into the evaporation space after being reheated. The whole of the work arising on expansion is transferred in direct mechanical coupling to one of two or more compression stages for compression of the carrier gas stream laden with solvent vapors. An apparatus for practicing the process is also disclosed.

18 Claims, 2 Drawing Figures

PROCESS AND APPARATUS FOR RECOVERY OF SOLVENTS

BACKGROUND OF THE INVENTION

1. Field of the Invention

This invention relates to a process and apparatus for recovery of solvents.

2. Description of the Prior Art

In the known processes and apparatus, which are described, for example, in *Ullmann's Encyclopedia of Technical Chemistry*, Vol. 1 (1951), page 338, a carrier gas stream laden with solvent vapors in an evaporation space is cooled to condense out solvent vapors and to separate the solvent. After condensation and separation the carrier gas stream lean in solvent vapors is returned into the evaporation space after being reheated. The solvent vapors are not completely condensed out of the carrier gas stream since there remains in the carrier gas stream a certain residual amount of solvent vapor, corresponding to the vapor pressure of the solvent at the temperature of the coolant. In order to avoid losses of solvent, the carrier gas stream is conducted in a circuit. The ability of the carrier gas stream, which is lean in solvent vapors, to take up solvent vapors is hence in fact somewhat reduced; however, this is unimportant for the efficiency of the process.

The process is quite generally suitable for removal of volatile solvents from non-evaporable substrates.

A field of application is the removal of solvent residues from chemical substances which have been produced or purified with the use of solvents. Further fields of application lie in the paint and lacquering fields, the field of chemical cleaning of textiles, the film and foil field, the rubber processing field, and the adhesives and adhesive materials field.

In prior art apparatus, generally, separate cooling devices for condensing out the solvent vapors and devices for reheating the carrier gas stream lean in solvent vapors are provided. Deficiencies in these prior art apparatus include that considerable amounts of coolant are required and a high energy demand to reheat the carrier medium lean in solvent vapors. This reheating of the carrier gas stream is necessary so that the carrier gas stream can rapidly become re-laden in the evaporation space with a sufficient amount of solvent vapor, i.e., so that the substrate is rapidly dried.

It was possible to attempt to achieve a saving of energy by using the coolant which has been heated on passage through the cooling device for reheating the carrier gas stream lean in solvent vapors, i.e., to conduct the coolant countercurrent to the carrier gas stream. However, it is immediately obvious that only a small fraction of the heat taken from the carrier gas stream previously in the cooling device can be returned to the carrier gas stream. Because of the relatively low temperature difference between the carrier gas and the coolant, the cooling device and the device for reheating the carrier gas stream have to be provided with large heat exchange surfaces.

The process is thus disadvantageous not only because of its high energy and coolant consumption, but also because of its high cost in apparatus.

An apparatus for recovery of solvent from a hot carrier gas stream laden with solvent vapors is known from DE-PS No. 27 25 252, in which the carrier gas stream is compressed, cooled, and expanded with production of work, for condensing out the solvent vapors and separating the solvent. The carrier gas stream lean in solvent vapors is conducted back into the evaporation space after being reheated.

Return of this carrier gas stream takes place, however, in admixture with a carrier gas stream taken from the evaporation space and laden with solvent vapors. After being heated in indirect heat exchange with the compressed carrier gas stream, the admixture is conducted back into the evaporation space in a duct loop together with the carrier gas stream lean in solvent vapors. Better heat regulation is accomplished but having the disadvantage that the carrier gas stream conducted back into the evaporation space has a relatively high content of solvent vapors. The drying effect in the evaporation space is reduced in this manner. It is further disclosed in DE-PS No. 27 25 252 that the work liberated by the expansion in an expansion turbine can be recovered. However, details are lacking as to where this work can be usefully utilized.

An object of the present invention is to improve upon a process and an apparatus of the kind described above, with low cost in apparatus while utilizing the work produced from the expansion of the compressed carrier gas stream laden with solvent vapors and the carrier stream returned to the evaporation space is as lean as possible in solvent vapors.

BRIEF DESCRIPTION OF THE INVENTION

A process for recovery of solvents is provided. A carrier gas stream laden with solvent vapors in an evaporation space is compressed, cooled, and expanded with production of work in order to condense out the solvent vapors and separate the solvent. The carrier gas stream lean in solvent vapors is conducted back into the evaporation space after being reheated. The process is characterized in that the whole of the work produced on expansion is transferred in direct mechanical coupling to one of two or more compression stages for compressing the carrier gas stream laden with solvent vapors.

An apparatus for carrying out the process includes in a carrier gas circuit: an evaporation space in which the heated carrier gas stream is laden with solvent vapors, a compressor, a cooling device for condensing the solvent vapors out of a carrier gas stream, an expansion apparatus, a solvent separator, and a device for reheating the carrier gas stream lean in solvent vapors. The apparatus is characterized by the expansion apparatus being directly mechanically coupled to one of two or more compressors.

DETAILED DESCRIPTION OF THE INVENTION

In the apparatus according to the invention, the carrier gas stream, conducted in the circuit, takes up the evaporated solvent in high concentration in the evaporation space (usually a dryer), and the solvent is withdrawn from the carrier gas stream in the cooling device by cooling and condensing. While the carrier gas stream laden with solvent vapors is in fact compressed, and expanded with production of work after cooling, in the prior art, the work of expansion is not used as compression work in the system, which is contrary to the present invention. Thus, in accordance with the present invention, only the difference between the compression and expansion work is to be supplied to the one compression stage, i.e., by means of an additional external work machine which is directly mechanically coupled to the one compressor. This difference covers the amount of work needed for separation of the solvent vapor from the carrier gas stream and also to overcome thermodynamic losses (friction, taking up heat from the surroundings).

The density of the mixture of carrier gas stream and solvent vapors is increased by compression. Hence the efficiency of the heat exchanger is increased. Because of the reduced gas volume, the heat exchanger and the other parts of the apparatus which are under pressure can be kept compact. Finally, no chemical, in particular no oxidative influence on the solvent vapors takes place during the compression and expansion, in contrast to recovery processes in which adsorbents such as active carbon are utilized. Such adsorbents can often act on the solvent vapors with the formation of injurious decomposition products. Since the carrier gas stream is constantly circulated, these decomposition products would build up and react undesirably with the products to be dried or with the parts of the apparatus. A known case is the decomposition of chlorinated hydrocarbons in the presence of water vapor, with the formation of hydrogen chloride.

The second or the further compression stages are preferably driven separately by work supplied from outside, i.e. the second or further compressors are mechanically coupled to external work machines. This arrangement ensures a better control of the compression process and among other things a better regulation of the desired final pressure. Further, the dimensions of the gearing required between the work machine and the compressor can be kept low.

An expansion turbine is preferably used as the expansion apparatus, because of its high efficiency. Additionally the expansion turbine is more easily coupled to a compressor than is, for example, a piston machine. The additional work machine is preferably an electric motor.

The process according to the invention can be applied, for example, in connection with the production of flat adhesive materials, in which an adhesive is applied to paper or textile lengths or tapes. Such tapes can, for example, be used as technical adhesive tapes or as tapes or lengths for medical purposes (e.g., adhesive plaster). In order to apply the adhesive to the length of paper or textile, the adhesive is brought to a fluid state by means of liquid solvents so that it can be applied in sufficiently thin and uniform layers. The solvent evaporates during drying. The coated substrate remains in an evaporation space in contact with the carrier gas, which takes up the solvent, for a time determined by the volatility and amount of solvent.

The examples of embodiments given below relate to apparatus for this special application. The invention is, however, applicable with success to the other fields of application mentioned hereinbefore.

Solvents for adhesives and also many other materials are usually solvents or solvent mixtures whose vapors are inflammable. According to the invention, for recovery of such solvent vapors there is used a carrier gas with an oxygen content lying below the ignition limit. Exemplary of such carrier gases are gases which are inert from the outset, such as nitrogen or carbon dioxide; however, the oxygen content of air can be reduced by admixture of an inert gas to an extent such that the ignition limit is no longer reached. In certain cases it is also possible to use combustion exhaust gases with a low oxygen content.

The inflammability of the solvent vapors is, however, not only a function of the oxygen content in the carrier gas, but also depends on the concentration and nature of the solvent vapor. Thus, for example, the danger of ignition is greater with low-boiling hydrocarbons and ethers than with halogenated hydrocarbons. The inflammability properties of various solvents are however known, and the permissible solvent vapor concentrations and oxygen contents can be taken from the literature or determined by simple tests.

The use of an inert or low-oxygen carrier gas stream affords the advantage that the carrier gas stream can take up a large amount of solvent vapors without the danger of an explosion arising. In this manner the amount of carrier gas to be circulated can be kept low, so that the amount of energy required for cooling or reheating the carrier gas can be reduced.

The process according to the invention is not restricted to the recovery of organic solvents; inorganic solvents, such as ammonia and sulfur dioxide, can also be used, and also solvents falling between inorganic and organic, such as carbon disulfide or carbon tetrachloride. Since these solvents (with the exception of carbon disulfide) are incombustible, the maintenance of a given concentration of oxygen in the carrier gas is not necessary in these cases, i.e., in the simplest case air can be used as carrier gas.

Control of the process according to the invention, among other things in relation to suiting the apparatus to different solvents or solvent mixtures, is possible in various ways. For example, the speed of the material to be dried and moving through the evaporation space can be varied. The most important effective means of process control is to vary the speed of the carrier gas or the pressure in the system by varying the rpm of the drive motor of the one or further compressors. Bypass regulation of one or more compressors can also be carried out for this purpose.

A particularly simple possibility of regulating the temperature of the carrier gas stream laden with solvent vapors consists of bringing it into indirect heat exchange with a coolant before, between, and/or after the individual compression stages. For this purpose, an indirect cooler can be inserted between the evaporation space and the first compressor, between the first and second or respective following compressors, and/or between the last compressor and the expansion apparatus. The entry temperature of the carrier gas stream, laden with solvent vapors, into the first or following compressor and/or into the expansion apparatus, or the entry temperature of the carrier gas stream lean in solvent vapors into the evaporation space, can be suited to requirements in a simple manner by control of the flow of coolant into the cooler or coolers.

By insertion of an additional indirect cooler between the last compressor and the expansion apparatus, the carrier gas stream lean in solvent vapors enters the evaporation space with a lower and more controllable initial temperature. The additional cooler usually precedes the heat exchanger through which flows the carrier gas stream lean in solvent vapors. Preferably this cooler can, however, be preceded by a heat exchanger ("hot" heat exchanger) and followed by a heat exchanger ("cold" heat exchanger). In this manner a carrier gas stream enters the evaporation space at a lower temperature.

When the carrier gas stream laden with solvent vapors is cooled in the cooling device after leaving the last compressor, a portion of the solvent vapors can condense, depending inter alia on the temperature of the carrier gas stream lean in solvent vapors which is used as coolant. There is, for example, the possibility that water separates, as its boiling point is higher than that of many organic solvents. Though water is not used in the solvent mixtures for usual self-adhesive adhesives, it is still introduced into the system, since it is adsorbed on the paper or textile lengths used as substrates for the adhesive. It can even occur in a few cases that the water freezes out in the cold part of the heat exchanger or in the expansion apparatus and thus blocks the flow cross sections or damages the moving parts of the expansion apparatus.

In order to counter this danger, a water soluble solvent in liquid form is injected into the cooled carrier gas stream before expansion. When the solvent is dissolved in water, there results a solution with a lower freezing point than that of water and remaining liquid.

When the cold solvent is not soluble in water, the water precipitates on the surface of the cold solvent droplets, and thus cannot deposit on the solid boundaries of the flow paths.

This measure is carried out, as regards apparatus, by providing devices for injection of the liquid solvent into the carrier gas stream between the heat exchanger and the expansion apparatus.

When it is not desired to inject a liquid solvent, or when the danger exists that the condensed liquid will damage the moving parts of the expansion apparatus, e.g., the blades of the expansion turbine, a portion of the solvent vapors can be condensed out and separated from the cooled carrier gas stream before expansion. A further solvent separator can be provided for this purpose between the heat exchanger and the expansion apparatus.

A further means of controlling the temperature of the carrier gas stream is expanding the carrier gas stream, without production of work, subsequent to a partial expansion with production of work. In this instance, an expansion valve can be provided before the evaporation space. This expansion valve can be provided either at the inlet or the outlet of the heat exchanger. By means of this expansion valve, control can also take place to prevent icing in the pipe ducts to the expansion apparatus or in the expansion apparatus itself.

On passage through the expansion valve a small further cooling of the carrier gas stream takes place, in this case without production of work. The thus expanded carrier gas stream can now be used, if necessary, after separation of the condensed-out solvent, in indirect heat exchange as cooling gas for the carrier gas stream expanded with production of work. For this purpose, a further heat exchanger, through which flows the carrier gas stream lean in solvent vapors, can be inserted between the expansion apparatus and the first solvent separator. The expansion valve is inserted immediately before this heat exchanger.

Two embodiments of the apparatus according to the invention are illustrated in the following drawings.

DETAILED DESCRIPTION OF THE DRAWINGS

Figure 1:
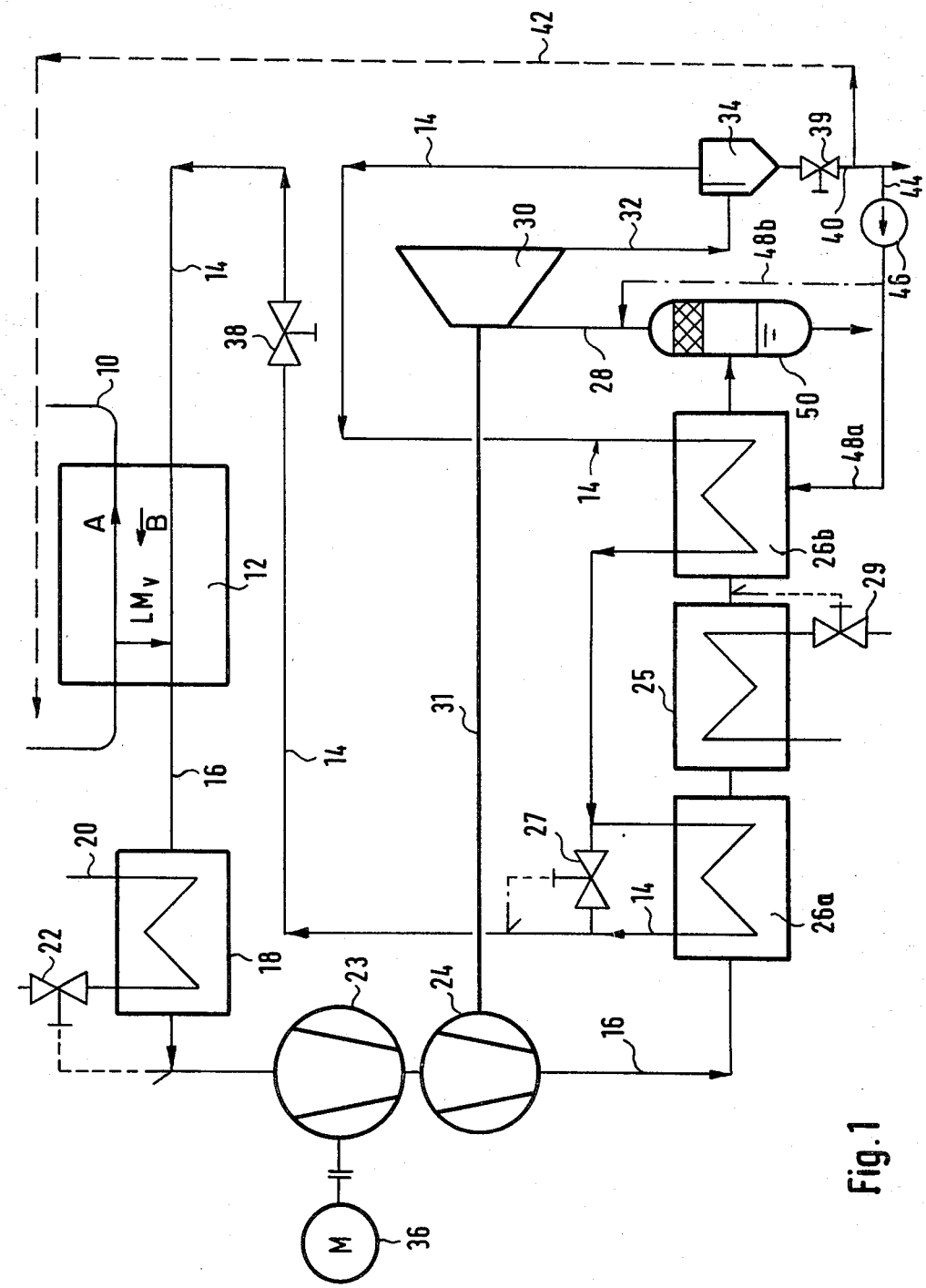
FIG. 1 is an apparatus in accordance with the invention in which the expansion apparatus is directly coupled to the second compressor, while the first compressor is coupled to an external work machine.

In the embodiment according to FIG. 1, a paper or textile length, 10, is provided with a coating of adhesive dissolved in a solvent. This length, 10, is moved (by drive means which are not shown) in the direction of the arrow A through the evaporation space, 12, which is shown schematically. The evaporation space, 12, is completely enclosed, so that no solvent vapors can reach the atmosphere.

A hot carrier gas stream, 14, e.g. a stream of nitrogen, lean in solvent vapors, is introduced into the evaporation space, 12, countercurrent (in the direction designated by arrow B) to the paper or textile length. Heating of this carrier gas stream takes place as described below.

The hot carrier gas stream, 14, flows through the evaporation space, 12, countercurrent to the paper or textile length, 10, and heats the paper or textile length, 10, to the extent that the solvent contained in the adhesive solution evaporates (illustrated by $LM_v$ in the drawing). The carrier gas stream thus becomes laden with solvent vapors and is cooled because of the heat of evaporation of the solvent. For example, when n-hexane is used as the solvent, the entry temperature of the gas stream into the evaporation space, 12, is, for example, 140° C., and the exit temperature is about 100° C. The carrier gas stream, 16, laden with solvent vapors leaving the evaporation space, 12, now enters a cooler, 18, through which a coolant, 20, flows in indirect heat exchange, with the stream, 16. The flow rate of the coolant and hence the temperature of the carrier gas stream, 16, laden with solvent vapors can be regulated by means of a throttle valve, 22. In the example shown in FIG. 1, the throttle valve, 22, is set so that the carrier gas stream leaving the cooler, 18, has a temperature of about 34° C., while the coolant, 20, is heated from about 12° to about 65° C.

The cooled carrier gas stream now enters the first compressor, 23, which is indirectly mechanically coupled via a coupling to an electric motor, 36, which acts as external work machine. The rpm of the electric motor, 36, can be controlled according to the low temperature required for condensation or the required volume for circulation. After compressor, 23, the carrier gas stream, 16, enters the second compressor, 24, which is directly mechanically coupled, as shown by the through shaft labeled 31, to the expansion apparatus, 30, further described below (an expansion turbine). The compressed carrier gas stream, 16, now enters heat exchanger, 26a ("hot" heat exchanger), in which it is cooled in indirect heat exchange with the carrier gas stream, 14, lean in solvent vapors. Heat exchanger, 26a, is bridged by a bypass valve, 27. An indirect cooler, 25, follows the heat exchanger, 26a, to regulate the temperature of the carrier gas stream. Without the cooler, 25, the carrier gas stream, 16, would have to be cooled so much in cooler, 18, that its temperature before entry into compressor, 23, would be only about 10° to 20° C. For this purpose cooler, 18, would have to be made very large. Insertion of cooler, 25, furthermore enables the temperature of the carrier gas stream to be regulated over a wide range, specifically, by corresponding actuation of coolant valve, 29.

Following cooler, 25, is a heat exchanger, 26b, ("cold" heat exchanger), in which the carrier gas stream is again cooled in indirect heat exchange with the carrier gas stream, 14, lean in solvent vapors (in this example, to about 0° C.). Regulation of the carrier gas stream, 14, lean in solvent vapors is possible by means of bypass valve, 27.

Since the temperature of the carrier gas stream laden with solvent vapors remains constant in the "cold" heat exchanger, 26b, (in the case of n-hexane about 0° C.), when the valve, 27, is open the mass flow of coolant through the additional cooler, 25, must be increased.

A portion of the solvent vapors condenses out in heat exchanger, 26b. This portion is removed in solvent separator, 50. However, this is only necessary when the carrier gas stream contains a high concentration of solvent vapors and the amount of solvent separated after heat exchanger, 26b, is so large that precautions have to be taken against damage to the expansion apparatus, 30, by solvent droplets.

The mixture, 28, of carrier gas stream partially laden with solvent vapors and possibly still having liquid solvent particles therein flows into the expansion apparatus, 30, constructed as an expansion turbine (modified turbosupercharger). As already described, the turbine, 30, is connected directly, via shaft, 31, mechanically to the compressor, 24. The work produced in expansion turbine, 30, can thus be utilized practically without losses for compression of the carrier gas stream, 16, laden with solvent vapors in compressor, 24, since no gearing losses arise. Motor, 36, which drives the first compressor, 23, is the single external energy source for the system, and the supply of energy can be flexible according to the demands of the system.

Because of the work produced, a further cooling of the carrier gas stream takes place in the expansion turbine, 30, and the mixture, 32, of carrier gas stream lean in solvent vapors and possibly still having present liquid solvent particles (a fraction higher than in 28) reaches solvent separator, 34, in which the mixture, 32, is separated. The carrier gas stream, 14, lean in solvent vapors leaving the solvent separator, 34, has a temperature, in the example used, of about −40° C., and flows successively through heat exchangers, 26b and 26a, in indirect heat exchange with the carrier gas stream, 16, laden with solvent vapors. The former is thereby heated to about 140° C., i.e., to a temperature required for evaporation of the solvent in the evaporation space, 12.

An expansion valve, 38, can be provided for further control of the temperature of this carrier gas stream. When the carrier gas stream passes through this valve there occurs a further cooling, without the production of work. The temperature of the system can thus be regulated not only by means of throttle valve, 22, but also by means of expansion valve, 38, in a simple manner. Without insertion of further regulating devices, the system can be adjusted for the most diverse solvent combinations with these two valves. The cooling of the carrier gas stream occurring at expansion valve, 38, can be used for cooling the carrier gas stream after the expansion turbine, 30, (not shown in the drawing), and a solvent separator can, if necessary, be inserted after expansion valve, 38.

Separation of the mixture into a carrier gas stream, 14, lean in solvent vapors, and liquid solvent (possibly mixed with solid ice particles), takes place in solvent separator, 34, as previously mentioned. Liquid solvent is drawn off via duct, 40. As a rule, the liquid solvent is immediately used for production of the solvent solution. For this purpose it may be necessary to separate out any water which may be present from the solvent, or to adjust the proportions of the individual solvent components. In general, however, the proportions of solvent components remain constant after a stable operating state has been attained, since the evaporation space, 12, is enclosed so that no solvent vapors escape during operation. Return of the recovered solvent is indicated by the dashed line, 42.

If necessary, a smaller portion of the recovered solvent can be conducted via duct, 44, to a pump, 46, and injected by means of the pump into the heat exchanger, 26b, and/or into the mixture, 28, before expansion turbine, 30. As already mentioned above, icing of the heat exchanger, 26b, the expansion apparatus, 30, and the connecting duct, 28, is to be prevented by means of this water-soluble solvent fraction, in that the solvent forms a low-melting mixture with the water to prevent deposition of ice on the cold solvent droplets. The solvent inlet ducts are labeled, 48a or 48b. Icing of the expansion turbine, 30, and also the danger of damage to the vanes of the expansion turbine by solvent droplets or ice particles are also reduced by means of solvent separator, 50.

Figure 2:
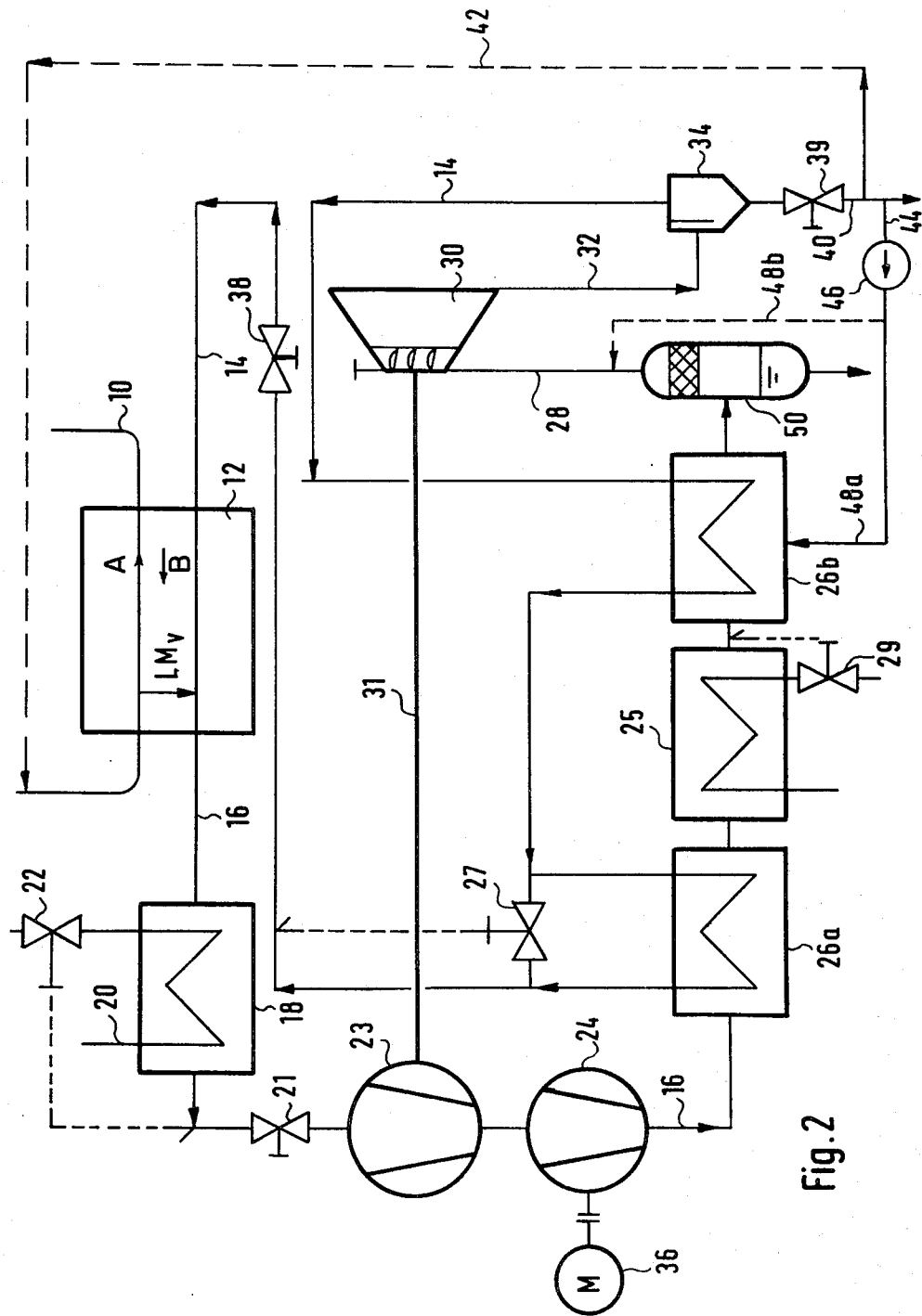
FIG. 2 is an apparatus in accordance with the invention in which the expansion apparatus is directly coupled to the first compressor, while the second compressor is coupled to an external work machine.

In the embodiment shown in FIG. 2, the elements which are identical or equivalent to those of FIG. 1 are given the same reference numerals. The most important difference is that the expansion apparatus, 30, is directly mechanically coupled to the first compressor, 23, (via shaft, 31), while the second compressor, 24, is coupled to the electric motor, 36. This arrangement has the advantage over that of FIG. 1 in that the pressure or temperature of the gas stream laden with solvent vapors before entry into the "hot" heat exchanger, 26a, can be regulated even better, since a deviation from the set values at this point can be countered directly by means of motor, 36, and the opposing control becomes immediately effective.

Furthermore, in this embodiment the expansion apparatus, 30, is constructed as an expansion turbine with guide vane adjustment, giving a further possibility of control and enabling the efficiency of the expansion turbine to be optimized in correspondence with the pressure and flow conditions in the system at any given time. Finally, a further valve, 21, is provided before compressor, 23, as a control element.

The invention is not limited to the examples of embodiments shown, but can be varied in manifold ways without departing from the scope of the invention which is defined by the following claims.

We claim:

1. In a process for recovery of solvents in which a hot carrier gas stream laden with solvent vapors from an evaporation space is compressed prior to the removal of solvent, cooled, and expanded with production of work for condensing the solvent vapors and separating the solvent, and the carrier gas stream lean in solvent vapors is then returned into the evaporation space after being reheated, the improvement comprising transferring the whole of the work arising on expansion by direct mechanical coupling to one of two or more compression stages for compression of the carrier gas stream laden with solvent vapors, said compression being prior to solvent removal.

2. The process according to claim 1, wherein the last compression stage is separately driven by externally supplied work.

3. The process according to claim 1, wherein a gas with an oxygen content lying below the ignition limit of the solvent vapors, is used as carrier gas.

4. The process according to claim 3, wherein said carrier gas is an inert gas.

5. The process according to claim 1, wherein the temperature of the carrier gas stream laden with solvent vapors is adjusted by indirect heat exchange with an external coolant.

6. The process according to claim 1, wherein a water-soluble solvent is injected in liquid form into the cooled carrier gas stream before expansion.

7. The process according to claim 6, wherein a part of the condensed, separated solvent is used for injection into the cooled carrier gas stream.

8. The process according to claim 1, wherein a portion of the solvent vapors is condensed from the cooled carrier gas stream and separated before expansion.

9. The process according to claim 1, wherein the carrier gas stream, partially expanded with production of work, is again expanded without production of work.

10. The process according to claim 9, wherein the carrier gas stream expanded without production of work is used as coolant gas in indirect heat exchange for the carrier gas stream expanded with production of work.

11. In an apparatus for the recovery of solvent in which there are included in a carrier gas circuit: an evaporation space in which a heated carrier gas stream is laden with solvent vapors, a compressor, a cooling device for condensing out the solvent vapors from the compressed carrier gas stream, an expansion apparatus, a solvent separator, and a device for reheating the carrier gas stream lean in solvent vapors; the improvement comprising means for feeding said heated carrier gas stream laden with solvent vapors directly to said compressor, and means to feed said compressor carrier gas stream directly into said device for condensing out the solvent vapors and wherein the expansion apparatus is directly mechanically coupled to one of at least two compressors.

12. The apparatus according to claim 11, wherein other than the first compressor is mechanically coupled to an external work machine.

13. The apparatus according to claim 11, wherein the expansion apparatus is an expansion turbine, and the additional work machine is an electric motor.

14. The apparatus according to claim 11, wherein between the evaporation space and the expansion apparatus at least one indirect cooler is inserted for regulation of the temperature of the carrier gas stream laden with solvent vapors.

15. The apparatus according to claim 13, wherein the indirect cooler is arranged between the last compressor and the expansion apparatus is preceded by a heat exchanger and followed by a heat exchanger.

16. The apparatus according to claim 11, wherein devices for injection of a liquid water-soluble solvent into the carrier gas stream are provided between the heat exchanger and the expansion apparatus.

17. The apparatus according to claim 11, wherein a further solvent separator is provided between the heat exchanger and the expansion apparatus.

18. The apparatus according to claim 11, wherein an expansion valve is provided before the evaporation space.

* * * * *